United States Patent [19]

Kuyath

[11] Patent Number: 5,018,976
[45] Date of Patent: May 28, 1991

[54] TEACHING SYSTEM FOR ENHANCING THE LEARNING OF SETS OF FACTS

[76] Inventor: Dorothy P. Kuyath, 6608 Portsmouth La., Raleigh, N.C. 27615

[21] Appl. No.: 463,538

[22] Filed: Jan. 11, 1990

[51] Int. Cl.[5] .............................................. G09B 1/00
[52] U.S. Cl. ..................................... 434/207; 434/347; 434/188; 273/299
[58] Field of Search ............... 434/207, 191, 188, 129, 434/170, 338, 339, 340, 347; 273/299, 272

[56] References Cited

U.S. PATENT DOCUMENTS

| | | |
|---|---|---|
| 239,385 | 3/1881 | Irwin . |
| 704,979 | 7/1902 | Terrazas ............................ 434/207 |
| 705,579 | 7/1902 | Gibson .............................. 434/191 |
| 1,244,000 | 10/1917 | Soltoft . |
| 1,385,623 | 7/1921 | Kellogg ............................ 434/347 |
| 1,450,395 | 4/1923 | Troidl . |
| 1,466,501 | 8/1923 | Gamble . |
| 1,696,988 | 1/1929 | Troidl . |
| 1,745,946 | 2/1930 | Murray ......................... 434/347 X |
| 1,836,851 | 12/1931 | Kidd . |
| 2,901,839 | 9/1959 | Huff . |
| 3,061,947 | 11/1962 | Faudree . |
| 3,127,176 | 3/1964 | Ryan ............................ 434/345 X |
| 3,221,418 | 12/1965 | Hoernes et al. .................. 434/343 |
| 3,864,850 | 2/1975 | Helmecke . |
| 3,918,174 | 11/1975 | Miller et al. ...................... 434/346 |
| 4,029,320 | 6/1977 | Hausmann ...................... 434/347 X |
| 4,176,472 | 12/1979 | Devanney . |
| 4,326,711 | 4/1982 | Giallombardo ................. 434/327 X |
| 4,478,582 | 10/1984 | Tucker ............................ 434/170 |
| 4,606,546 | 8/1986 | Rita ................................ 434/269 |
| 4,674,752 | 6/1987 | Brothers ......................... 273/254 |
| 4,877,254 | 10/1989 | Yuscavage ...................... 273/249 |
| 4,883,277 | 11/1989 | Leisure ......................... 434/129 X |
| 4,903,990 | 2/1990 | Crowdis ........................ 434/191 X |

FOREIGN PATENT DOCUMENTS 1601216 10/1981 United Kingdom ................ 434/129

OTHER PUBLICATIONS

Trivial Pursuit, 1981.

Primary Examiner—Richard J. Apley
Assistant Examiner—Rachel M. Healey

[57] ABSTRACT

A flash card type of teaching system includes problem cards that are divided into sets by color coding. A key card that is in view of the student(s) contains answer information that is also color coded to assist the student(s) in choosing the correct response to a particular problem.

4 Claims, 3 Drawing Sheets

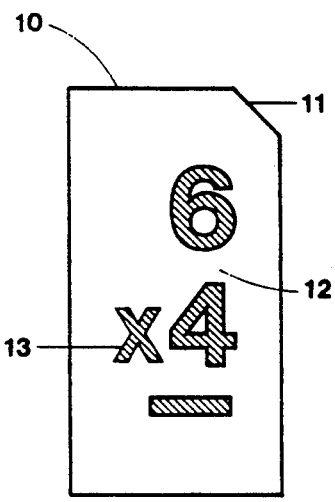
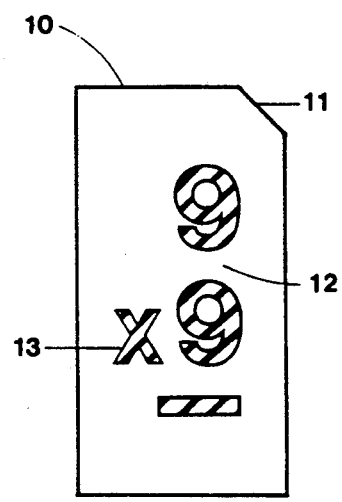
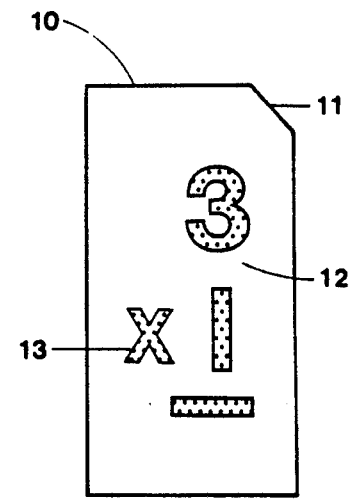
FIG 1A     FIG 1B     FIG 1C
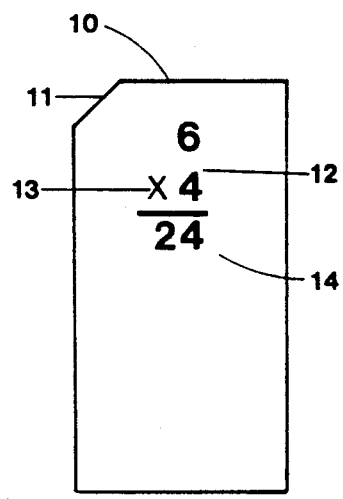
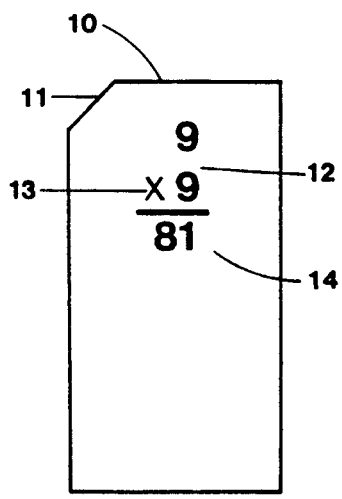
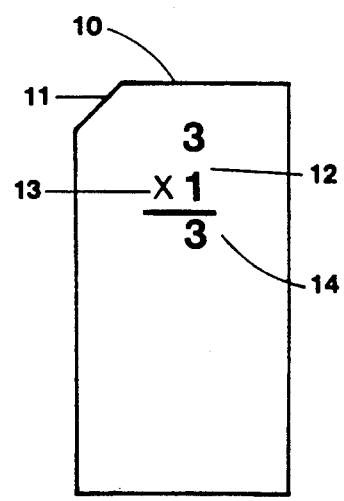
FIG 2A     FIG 2B     FIG 2C
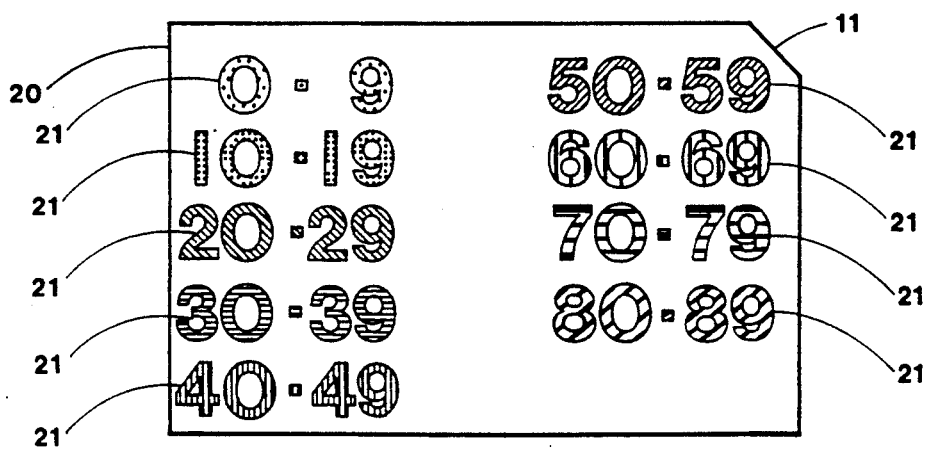
FIG 3

TEACHING SYSTEM FOR ENHANCING THE LEARNING OF SETS OF FACTS

FIELD OF INVENTION

This invention relates to educational devices, specifically to an educational device that employs the use of color to clarify and solidify information being taught.

BACKGROUND OF THE INVENTION

Several educational devices which employ the concept of color-coding a problem with a related answer have been proposed, however these educational aids are handicapped by a number of disadvantages that prevent them from being entirely successful or readily acceptable to students and educators.

U.S. Pat. No. 1,244,000 issued Oct. 23, 1917 to H. Soltoft and U.S. Pat. No. 4,176,472 issued Dec. 4, 1979 to M. T. Devanney use color-coding to reinforce the concept of number valuation. Both of these educational devices, however, are directed only to teaching the value and use of numbers and can be conveniently employed by only one user at any one time. Also, no independent answer verification is provided to the user to confirm a correct response; only the matching of colors provides this confirmation. Additionally, the former provides that a combination of colors be used for a single response in some instances (i.e. for the response of "10", the integer "1" and the integer "0" are lined in different colors), thus leading to additional printing costs for the elements containing these responses and confusion on the part of the user. The latter requires that a bulky frame be used to support and display the educational device and is only designed to incorporate the integers 0 through 10.

A second group of patents, typified by U.S. Pat. No. 1,450,395 issued Apr. 3, 1923 and U.S. Pat. No. 1,696,988 issued Jan. 1, 1929, both to N. Y. Troidl, and U.S. Pat. No. 3,864,850 issued Feb. 11, 1975 to A. P. Helmecke, employ color-coding of arithmetical problems and related answers. With these educational devices, however, problem and answer components must be physically placed side by side in order for the user to verify that his or her response is correct and even then, only the matching of colors provides this confirmation (again, no independent answer verification is provided to the user). Also, because bulky frames or similar supports limit the capacity of these teaching devices, they are unable to conveniently contain a sufficient number of integers to display all possible problem and answer combinations. The nature of these educational devices also renders them suitable for only one user at a time. Also, with these devices, it is necessary for every answer to occupy a separate component of the apparatus; with the first two patents, this consists of a single answer affixed to one face of a cube or card and with the latter, this consists of a single answer per card. Having every individual answer occupy a separate component of the apparatus reduces the device's ability to conveniently accommodate an expanded array of answers. Also, two of these patents, U.S. Pat. No. 1,450,395 and U.S. Pat. No. 3,864,850 use more than one color for different components of a single equation, thus leading to additional printing costs for the elements bearing the equation components and generally reducing the effectiveness of the use of color as a mnemonic device. The latter also employs a combination of two colors for a single response, i.e. each integer of a two digit response is lined in a different color.

Educational devices which are limited to the teaching of multiplication through the use of color-coded problems and related answers are typically illustrated by U.S. Pat. No. 239,385 issued Mar. 29, 1881 to J. E. Irwin and U.S. Pat. No. 1,466,501 issued Aug. 28, 1923 to A. A. Gamble. Both of these devices share several of the disadvantages cited above, namely the absence of an independent answer verification, the requirement that problem and answer components by physically placed side by side to verify response, and the convenient use of the apparatus by only one user at a time. Also, with these patents, every answer must be contained on a separate component of the apparatus and neither of these devices provide for the inclusion of the singular integer 0. An additional disadvantage not previously mentioned, for both of these devices, is that equations must be broken into three components consisting of the multiplier, the multiplicand and the product, rather than two components consisting of the multiplier and the multiplicand combined and the product. Having three separate components requires that the educational device employ more elements than is necessary to effectively convey its concept. In addition, U.S. Pat. No. 1,466,501 is contained in a framework that limits its physical capacity and renders it unable to provide for all possible combinations of multiplier and multiplicand. This patent also employs more than one color for different components of any single equation and also uses a combination of two colors, in some instances, for multiple integers of a single response, both of which can lead to confusion on the part of the user.

Other educational devices, believed to be more closely related to my invention are typically illustrated by U.S. Pat. No. 1,836,851 issued Dec. 15, 1931 to G. W. Kidd, U.S. Pat. No. 2,901,839 issued Sept. 1, 1959 to D. E. Huff, and U.S. Pat. No. 3,061,947 issued Nov. 6, 1962 to D. W. Faudree. All of these devices, however, suffer from the disadvantage of using more than one color for different parts of a single equation. U.S. Pat. No. 2,901,839, in fact, even color codes the same specific answer with different colors in different instances, i.e. when multiplying 7 times 8, the response of "56" is coded in black and when multiplying 8 times 7, the response of "56" is coded in orange, thus causing confusion for the user and reducing the effectiveness of the use of color as a mnemonic device. This patent also displays solutions on the face of the apparatus where the problem appears, thus eliminating the device's ability to solicit an answer from the user. U.S. Pat. No. 3,061,947 uses a combination of colors for multiple integers in certain single responses, this also providing confusion to the user and reducing the effectiveness of the teaching device. U.S. Pat. No. 1,836,851 also has a number of disadvantages mentioned for patents previously discussed, that is the requirement that problem and answer components be physically placed side by side to confirm a user's response, the absence of independent answer verification, and the convenient use of the apparatus by only one user at a time. Also, in U.S. Pat. No. 1,836,851, equations must be broken into three components, rather than two, and only the integers 1 through 5 are incorporated as possible problem components.

SUMMARY OF THE INVENTION

According to the present invention there is provided a teaching system that enhances the learning of sets of facts. The system includes a plurality of problem cards each of which has a problem on one face. The problem cards are grouped by common problem answer characteristics into a plurality of sets. The cards of each set have a unique visually discernible characteristic, such as a visibly distinguishable color. The system also includes a key card which has a plurality of answer areas. Each answer area contains problem answer information for one of the sets of problem cards. Each answer area is displayed with the unique visually discernible characteristic for its respective set of problem cards.

Accordingly, several objects and advantages of the present invention are:

(a) To provide an educational device that offers assistance in teaching and learning the mathematical operations of addition, subtraction, multiplication and division, and other educational subjects, wherein problems presented and their related answers are associated with a particular color, whereby matching the color of a problem with the color of its answer will prompt a user of the device to choose the correct response to a particular problem situation.

(b) To provide an educational device wherein associative relationships between problems and their answers enhance the probability that information will be easily remembered.

(c) To provide an educational device which may be utilized simultaneously by a group of users, as well as by a single user.

(d) To provide an educational device whose capacity can conveniently expand to include all possible problem combinations pertaining to information being taught.

(e) To provide an educational device that eliminates the need for individual answers to occupy separate components of the apparatus.

(f) To provide an educational device which does not require bulky frames or similar supports to display the apparatus.

(g) To provide an educational device wherein a problem and its related answer components need not be physically placed side by side in order to utilize the apparatus.

(h) To provide an educational device with a color-coding system wherein an entire problem and its entire solution will be consistently coded in a single color so as to reduce confusion on the part of the user and maximize the use of color-coding as a mnemonic device.

(i) To provide a teaching device with a color-coding system wherein the same color will be consistently used to indicate a range of answers, a group of answers or a specific answer in all situations.

(j) To provide an educational device that, when used in the instruction of arithmetic, divides a mathematical equation into only two components consisting of the two elements of the problem as one component and the solution as a second component.

Further objects and advantages are to provide an educational device which is simple to manipulate, economical to produce, and convenient to use, which will provide educators with an improved approach to teaching facts requiring memorization, which will enable students to learn facts requiring memorization more quickly, which will minimize the role of rote memorization in learning such facts, and which will employ a reasonable mnemonic device in order to enhance the learning process. Still further objects and advantages will become apparent from a consideration of the ensuing description and drawings.

BRIEF DESCRIPTION OF THE DRAWINGS

In the drawings, closely related figures have the same number but different alphabetic suffixes.

FIGS. 1A, 1B, and 1C are front views of the preferred embodiment of information-bearing elements in accordance with the present invention.

FIGS. 2A, 2B, and 2C are back views of the preferred embodiment of information-bearing elements shown in FIGS. 1A, 1B, and 1C.

FIG. 3 is the front view of the preferred embodiment of a master information-bearing element in accordance with the present invention.

The drawings are lined for color, and similar reference characters refer to similar parts throughout the several views of the drawings.

DESCRIPTION OF THE PREFERRED EMBODIMENTS

Figure 4:
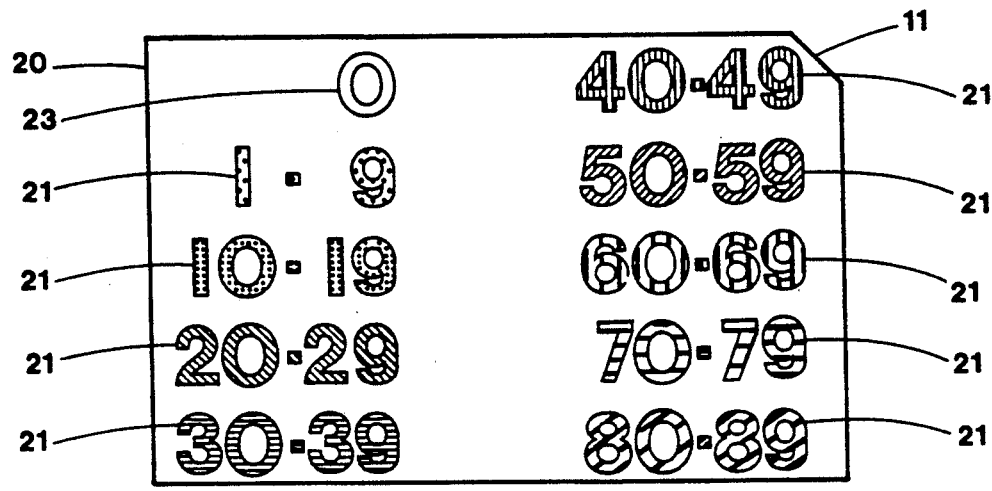
FIG. 4 is the front view of an alternative embodiment of a master information-bearing element of the present invention.

The preferred embodiment of the teaching device of the present invention is illustrated in FIG. 1A (front view), FIG. 2A (back view) and FIG. 3. FIG. 1A illustrates the front view of a flat, planar information-bearing element or problem card 10 having a corner that differs in shape from the remaining three corners 11 and having indicia representing components of an arithmetical problem 12 and a functional sign of operation 13 adjacent thereto. In the preferred embodiment, this information-bearing element 10 is constructed of a stiff, heavy paper such as cardboard. However, this information-bearing element 10 can be constructed of any other similar suitable material. The arithmetical problem 12 in FIG. 1A, illustratively 4×6, and its functional sign of operation 13 are lined in a specific color, illustratively green. FIG. 2A illustrates the back view of the flat, planar information-bearing element or key card 10 shown in FIG. 1A and contains indicia representing the arithmetical problem 12, its functional sign of operation 13, and its answer 14, in this illustration "24", to the arithmetical problem 12 presented on the front of the information-bearing element or key card 10 of FIG. 1A. FIG. 3 illustrates the front view of a flat, planar master information-bearing element 20 having a corner that differs in shape from the remaining three corners 11 and having indicia representing a series of ranges of answers 21 containing answers to all arithmetical problems 12 displayed on the front faces of all information-bearing elements 10. In the preferred embodiment, this master information-bearing element 20 is constructed of a stiff, heavy paper such as cardboard. However, this master information-bearing element 20 can be constructed of any other similar suitable material. The ranges of answers 21 containing all answers to arithmetical problems 12 on the front faces of the information-bearing elements 10 are lined in various colors which correspond in color to the arithmetical problems 12. The specific range of answers 21 which includes the answer 14 to the problem 12 presented on the front face of the information-bearing element 10 in FIG. 1A, that is "20-29" which includes the answer 14 of "24", is lined in green, thus corresponding in color to the arithmetical problem 12 on the front face of the information-bearing element 10 in FIG. 1A.

FIGS. 1B and 1C illustrate front views of additional examples of flat, planar information-bearing elements 10 having a corner that differs from the remaining three corners 11 and having indicia representing components of an arithmetical problem 12 and a functional sign of operation 13 adjacent thereto. The indicia on the front faces of these information-bearing elements 10 corresponds in color to ranges of answers 21 containing the solution to their stated problems 12 on the master information-bearing element 20 in FIG. 3. FIGS. 2B and 2C illustrate the back views of the information-bearing elements 10 in FIGS. 1B and 1C and bear the arithmetical problems 12 shown on their front faces, their functional signs of operation 13, and their answers 14.

FIG. 4 illustrates the front view of an alternative embodiment of a flat, planar master information-bearing element 20 having a corner that differs from the remaining three corners 11 and having indicia on the front face representing the integer "0" as an individual answer 23 and also ranges of answers 21, the combination of which include all answers to all arithmetical problems 12 displayed on all information-bearing elements 10. The individual integer "0" 23 and the additional ranges of answers 21 are lined in various colors which correspond in color to the indicia representing the arithmetical problems 12 on the front faces of the information-bearing elements 10. In the illustrative example above, the specific range of answers 21 which includes the answer 14 to the problem 12 presented on the front of the information-bearing element 10 in FIG. 1A, that is "20-29", which includes the answer 14 of "24", is lined in green, thus corresponding in color to the indicia representing the arithmetical problem 12.

Figure 5:
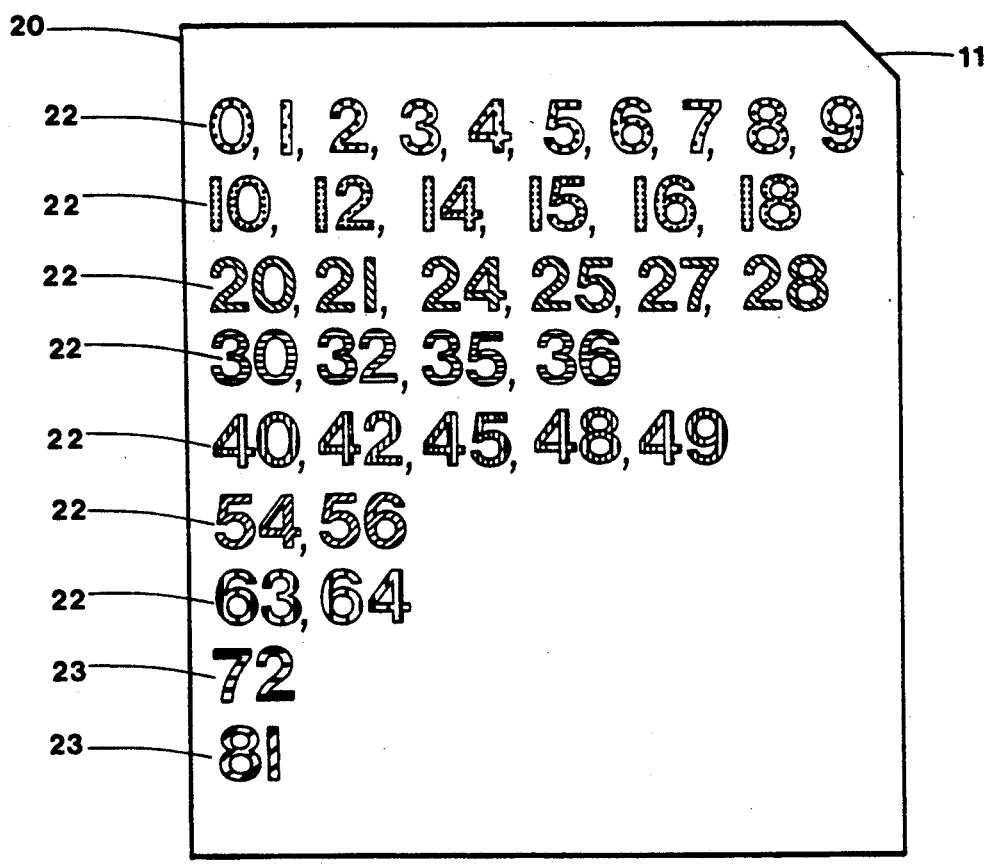
FIG. 5 is the front view of a third embodiment of a master information-bearing element of the present invention.

FIG. 5 illustrates the front view of a third alternative embodiment of a flat, planar master information-bearing element 20 having a corner that differs from the remaining three corners 11 and having indicia on the front face representing individual answers 23 and also a series of groups of individual answers 22, the combination of which include the answers to all arithmetical problems 12 displayed on all information-bearing elements 10. The individual answers 23 and the additional groups of series of individual answers 22 are lined in various colors which correspond in color to the indicia representing the arithmetical problems 12 on the front faces of the information-bearing elements 10. In the illustrative example above, the specific series of individual answers 22 which includes the answer to the problem 12 presented on the front of the information-bearing element 10 in FIG. 1A, that is "20, 21, 24, 25, 27, 28", which includes the answer 14 of "24", is lined in green, thus corresponding in color to the indicia representing the arithmetical problem 12. While, for convenience, the information-bearing elements 10 shown in the drawings contain information about mathematics, the information displayed thereon could relate to musical notes, phonetics, or virtually any subject. The "problem" could be, for example, a drawing of a musical staff with a note placed on a specific line or space and the "answer" could be the alphabetic letter associated with this note.

Figure 6:
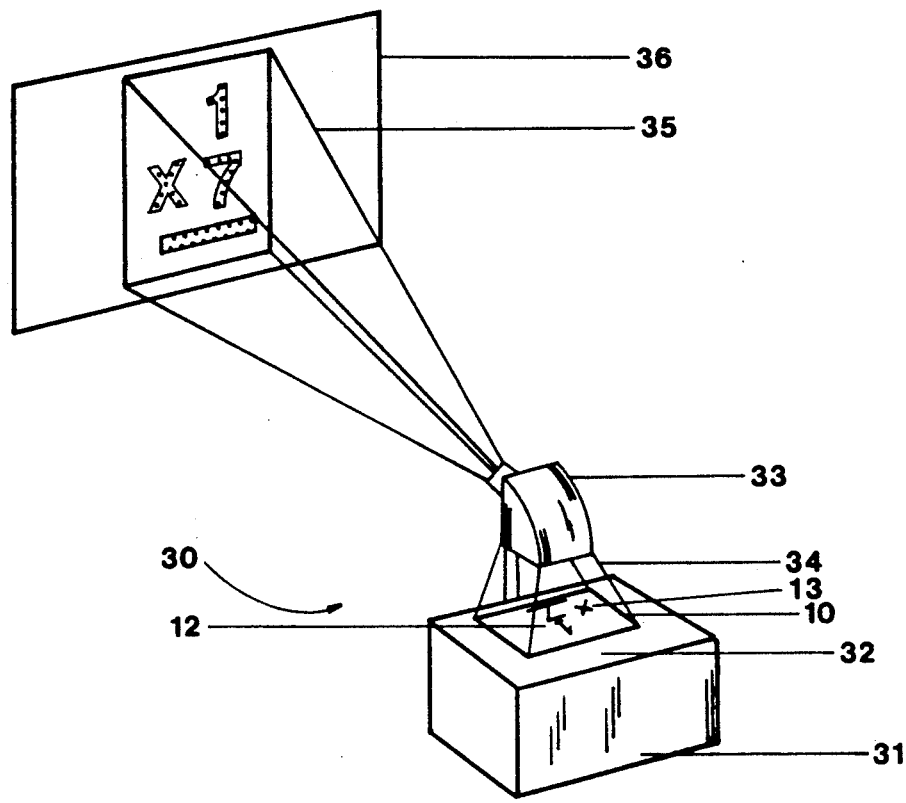
FIG. 6 is a perspective view of a modified embodiment of the educational device of the present invention.

FIG. 6 is a perspective view of a modified embodiment of the present invention and provides for the information-bearing element 10 to be constructed of a transparent material suitable for use with a conventional overhead projector. In FIG. 6, there is shown a conventional projector 30 having a main housing 31 with a light source therein projecting upwardly through surface 32 into reflector 33. Positioned atop surface 32 is an information-bearing element 10 constructed of a transparent material containing indicia representing components of an arithmetical problem 12, in this illustration one of multiplication, and having indicia representing a functional sign of operation 13 adjacent thereto. Thus, the images formed by the information-bearing element 10 are reflected upwardly along light beams 34 through the reflector 33 and via light beams traveling to screen 35 onto screen 36. The arithmetical problem 12, illustratively $7 \times 1$, and its functional sign of operation 13 are lined in a specific color, illustratively blue, which corresponds in color to the specific range of answers 21 containing the answer 14 on the master information-bearing element 20 in FIG. 3, that is "0-9" which includes the answer of "7".

The arithmetical problem 12, illustratively $7 \times 1$, and its functional sign of operation 13, both illustratively lined in blue, also corresponds in color to the specific range of answers 21 containing the answer 14 on the alternative master information-bearing element 20 in FIG. 4, that is "1-9", which includes the answer of "7". The arithmetical problem 12, illustratively $7 \times 1$, and its functional sign of operation 13, both illustratively lined in blue, also corresponds in color to the specific series of individual answers 22 containing the answer on the alternative master information-bearing element 20 in FIG. 5, that is "0, 1, 2, 3, 4, 5, 6, 7, 8, 9", which includes the answer of "7".

Figure 7:
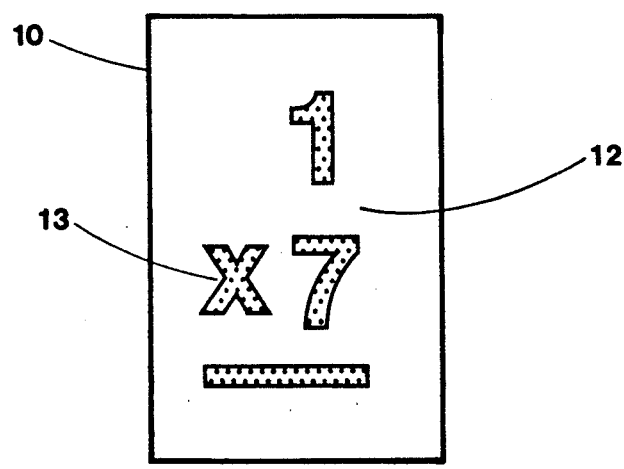
FIG. 7 is a front view of an information-bearing element of the educational device shown in FIG. 6.

FIG. 7 illustrates the front view of the information-bearing element 10 constructed of a transparent material suitable for use with a conventional overhead projector.

It is noted that the selection of colors in the present invention is arbitrary, and may be varied at will, so long as the same color is consistently used throughout the set of information-bearing elements 10 for components of arithmetical problems 12 and their functional signs of operation 13 and related ranges of answers 21, series of individual answers 22, and individual answers 23 contained on master information-bearing elements 20.

Also, in FIGS. 1, 2, and 7, color-coding is accomplished by lining the problem 12 and its functional sign of operation 13 for color, but it will be understood that color-coding may also be accomplished by printing the problem 12 and its functional sign of operation 13 in an arbitrary color upon an information-bearing element 10 whose front face is lined in a specific color. For example, in this situation, problems 12 and their functional signs of operation 13 could be printed in black upon information-bearing elements 10 having front faces of various colors which correspond in color to the specific range of answers 21 containing the answer 14 to the problem 12 they bear, the specific series of individual answers 22 containing the answer 14 to the problem 12 they bear, or the specific individual answer 23 to the problem 14 they bear on the master information-bearing element 20.

Operation

To use the teaching device of the present invention, the information-bearing elements 10 are arranged in a uniform manner, i.e. a manner having the problem face side of all the elements 10 facing in the same direction and with printed matter thereon oriented for easy reading, by employing the corner of the elements differing from the other three 11. This feature is also useful to a manipulator when he or she wishes to mix the elements 10 for indiscriminate location. The front faces of the information-bearing elements 10 are then displayed, one at a time and in any order, to a single student or group of students having in their prossession, or in their view, a master information-bearing element 20. The master information-bearing element 20 is employed by each student to reduce response possibilities to a specific individual answer 23, to a specific range of answers 21, or to a specific series or group of individual answers 22, through the process of matching the color of the problem 12 on the information-bearing element 10 being displayed with the corresponding color of the specific individual answer 23, the specific range of answers 21, or the specific series of individual answers 22 on the master information-bearing element 20. Students are prompted by the master information-bearing element 20 to make correct answer choices and may call out answers which may then be verified by the manipulator, or in the case of self-study, may turn over the information-bearing element 10 to reveal the arithmetical problem 12, its functional sign of operation 13, and the actual answer 14 to the problem 12.

For example, the information-bearing element having the arithmetical problem 12 of 9×9, as illustrated in FIG. 1B, lined in orange for illustrative purposes, may be displayed. The student or students, using the master information-bearing element illustrated in FIG. 3, would immediately realize that the response to this problem would be contained in the range of answers 21 lined in orange on the master information-bearing element 20, that is "80–89" which contains the answer of "81". Following this process, each student could limit their response selection, and thereby reduce the possibility of error and increase the likelihood of correctness. Students could provide correct responses quickly, thus allowing the manipulator to provide positive reinforcement to the student much earlier than would be possible with other teaching methods. In situations where the manipulator is unfamiliar with the arithmetical facts contained on the information-bearing elements 10, the answer 14 on the back face of the information-bearing element 10 will provide a means for verifying a correct response or disputing an incorrect response.

To use the present invention in an alternative embodiment as illustrated in FIG. 6, the information-bearing elements 10, as illustrated by the example in FIG. 7, are constructed of a transparent material suitable for use with a conventional overhead projector 30, and are displayed, one at a time and in any order, with a conventional projector 30 onto a screen 36 which is visible to all students participating in the learning exercise. All students participating have in their possession an individual master information-bearing element 20 or have in their view, a large master information-bearing element 20 which can be seen by all participants. The master information-bearing element 20 is employed by each student to reduce response possibilities by matching the color of the problem 12 on the displayed information-bearing element 10 with the corresponding color of the specific range of answers 21, the specific series of individual answers 22, or the specific individual answer 23 on the master information-bearing element 20. Students may call out answers which may then be verified by the manipulator.

It should be noted that FIG. 3 illustrates the preferred embodiment of the master information-bearing element 20, while FIGS. 4 and 5 illustrate alternate forms of master information-bearing elements 20. A choice among the three forms should be made by a student or instructor and only one of the three forms should be used at any one time. In FIGS. 1–7, multiplication tables consisting of 0×0 through 9×9 inclusive, are utilized, but it will be understood that these tables may be reduced or expanded. In FIGS. 1–7, problems 12 are illustrated in a vertical manner, but it will be understood that these problems 12 may be shown in a horizontal manner as well. Also, in FIGS. 1–7, one master information-bearing element 20 is shown, however it may be useful to employ additional identical master information-bearing elements 20 in actual practice, thereby increasing the number of students that may utilize a single set of information-bearing elements 10 at any one time. When a plurality of master information-bearing elements 20 are utilized, the corner of the master information-bearing elements differing from the other three 11 may be used to assemble the master information-bearing elements 20 in a manner having all printed face sides facing in the same direction. In FIG. 3, nine ranges of answers 21 are illustrated but it will be understood that fewer or more ranges of answers 21 may be employed. In FIG. 4, the integer "0" is illustrated as a separate individual answer 23 but it will be understood that any or all integers may be shown as individual answers 23 on master information-bearing elements 20. In FIG. 5, seven series of individual answers 22 and two separate individual answers 23 are illustrated, but it will be understood that fewer or more series of individual answers 22 or separate individual answers 23 may be employed. In some instances, where information pertaining to subjects other than mathematics is displayed, a master information-bearing element 20 containing ranges of answers 21 may not be appropriate and the master information-bearing element 20 may contain only individual answers 23. For example, if the educational device is utilized for the instruction of musical note names, wherein a problem 12 consists of a symbol showing a musical staff with a note placed on a specific line or space, the master information-bearing element 20 may contain only the individual answers 23 consisting of symbol descriptions "A", "B", "C", "D", "E", "F", and "G", each lined in a specific color which corresponds to the color of the problem 12 on individual information-bearing elements 10.

Any arithmetical process including addition, subtraction, multiplication and division may be utilized. Also, the concept of the teaching device of the present invention is eminently suitable for incorporating other educational concepts to assist students in learning commonly experienced relationships. Such relationships include phonetics whereby a problem 12 could consist of a symbol representing a phonetic sound and an answer 14 could consist of a symbol description representing letters of the alphabet, musical notes whereby a problem 12 could consist of a symbol representing a musical note placed on a musical staff and an answer 14 could consist of a symbol description representing letters of the musical scale, and state descriptions whereby a problem 12 could consist of a pictorial symbol of a state and an answer 14 could consist of a symbol description consisting of a state name. The teaching device of the present invention is also very versatile as to size. Large versions suitable for classroom demonstrations are contemplated wherein information-bearing elements 10 large enough to be easily viewed by an entire classroom and a poster-size master information-bearing element 20 are employed, as are small versions suitable for use by a child studying alone.

SUMMARY OF CERTAIN ADVANTAGES OF THE INVENTION

Accordingly, the reader will see that the educational device of this invention can be used to teach and learn information in a simple and expedient manner and can be manufactured economically. In addition, the educational device of this invention will minimize the role of rote memorization in learning information by utilizing a reasonable mnemonic device of color to enhance the learning process.

Although the description above contains many specificities, these should not be construed as limiting the scope of the invention but as merely providing illustrations of some of the presently preferred embodiments of this invention.

Thus, the scope of the invention should be determined by the appended claims and their legal equivalents, rather than by the examples given.

I claim:

1. A teaching system for enhancing the learning of sets of mathematical facts, said teaching system comprising:

a plurality of problem cards each of which has a mathematical problem on one face thereof, said problem cards being grouped into a plurality of sets corresponding to numeric ranges into which their respective answers fall, the cards of each set having a unique visually discernible characteristic; and a key card for providing answer information independent of the problems, said key card including a plurality of ranges of answers with each range being defined as a numeric range with a lowermost value and an uppermost value, each range being displayed with the unique visually discernible characteristic associated with the respective set of problem cards whose answers fall therein.

2. The teaching system of claim 1 wherein each problem card includes the answer to its respective problem on the opposite face from the problem.

3. The teaching system of claim 1 wherein the problems on said problem cards are mathematical problems selected from the group of problems consisting of addition problems, subtraction problems, division problems and multiplication problems.

4. A color coded teaching system for enhancing the learning of sets of mathematical facts, said teaching system comprising:

a plurality of color coded problem cards each of which has a mathematical problem on one face thereof, said problem cards being grouped into a plurality of sets corresponding to numeric ranges into which their respective answers fall, the cards of each set displaying a unique visually discernible color; and a key card for providing answer information independent of the problems, said key card including a plurality of ranges of answers with each range being defined as a numeric range with a lowermost value and an uppermost value, each range being displayed with the unique visually discernible color associated with the respective set of problem cards whose answers fall therein.

* * * * *